United States Patent
Calciu et al.

(10) Patent No.: US 11,971,833 B2
(45) Date of Patent: *Apr. 30, 2024

(54) DYNAMIC BUFFER SELECTION IN ETHERNET CONTROLLERS

(71) Applicant: LENOVO GLOBAL TECHNOLOGY (UNITED STATES) INC., Morrisville, NC (US)

(72) Inventors: Corneliu-Ilie Calciu, Bucharest (RO); Catalin-Eugen Nitipir, Bucharest (RO); Radu Mihai Iorga, Bucharest (RO); George-Andrei Stanescu, Ilfov (RO)

(73) Assignee: LENOVO GLOBAL TECHNOLOGY (UNITED STATES) INC., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,636

(22) Filed: Mar. 31, 2022

(65) Prior Publication Data

US 2023/0315660 A1  Oct. 5, 2023

(51) Int. Cl.
*G06F 13/28* (2006.01)
*G06F 3/06* (2006.01)

(52) U.S. Cl.
CPC .............. *G06F 13/28* (2013.01); *G06F 3/061* (2013.01); *G06F 3/0656* (2013.01); *G06F 3/0673* (2013.01); *G06F 2213/28* (2013.01)

(58) Field of Classification Search
CPC ....... G06F 11/00; G06F 11/16; H04L 49/9052
See application file for complete search history.

(56) References Cited

U.S. PATENT DOCUMENTS

| | | | |
|---|---|---|---|
| 2011/0119557 A1* | 5/2011 | Chen | G06F 13/28 710/308 |
| 2013/0188648 A1* | 7/2013 | Nakatsugawa | H04L 47/624 370/394 |
| 2014/0177443 A1* | 6/2014 | Nishimura | H04L 47/56 370/235.1 |
| 2014/0310374 A1* | 10/2014 | Lee | H04L 67/568 709/213 |
| 2015/0019923 A1* | 1/2015 | Michels | G06F 13/28 709/212 |
| 2015/0134923 A1* | 5/2015 | Kulkarni | G06F 3/067 711/162 |
| 2019/0044893 A1* | 2/2019 | Richardson | H04L 49/901 |

OTHER PUBLICATIONS

Wakeman et. al, AN-873 Architectural Choices for Network Performance, 2011, National Semiconductor Corporation, USA, URL: https://www.ti.com/lit/an/snoa275/snoa275.pdf?ts=1633728173047&ref_url=https%253A%252F%252Fwww.google.com%252F, 18 pages.

* cited by examiner

*Primary Examiner* — Getente A Yimer

(57) ABSTRACT

Dynamic buffer selection in ethernet controllers including determining, by an ethernet controller, based on a received header of a packet, a length of the packet; selecting, from a plurality of buffers, a buffer of a buffer size based on the length of the packet, wherein the plurality of buffers comprises a plurality of different buffer sizes; and transferring the packet to the selected buffer.

15 Claims, 3 Drawing Sheets

DYNAMIC BUFFER SELECTION IN ETHERNET CONTROLLERS

BACKGROUND

Field of the Invention

The field of the disclosure is data processing, or, more specifically, methods, apparatus, and products for dynamic buffer selection in ethernet controllers.

Description of Related Art

Ethernet controllers may transfer received packets to buffers included in host memory. In order to accommodate large packets, larger buffers may be allocated in host memory. However, such large buffers may be inefficiently utilized for packets with smaller packet lengths.

SUMMARY

Methods, apparatus, and products for dynamic buffer selection in ethernet controllers according to various embodiments are disclosed in this specification. Such dynamic buffer selection in ethernet controllers may include: determining, by an ethernet controller, based on a received header of a packet, a length of the packet; selecting, from a plurality of buffers, a buffer of a buffer size based on the length of the packet, wherein the plurality of buffers comprises a plurality of different buffer sizes; and transferring the packet to the selected buffer.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
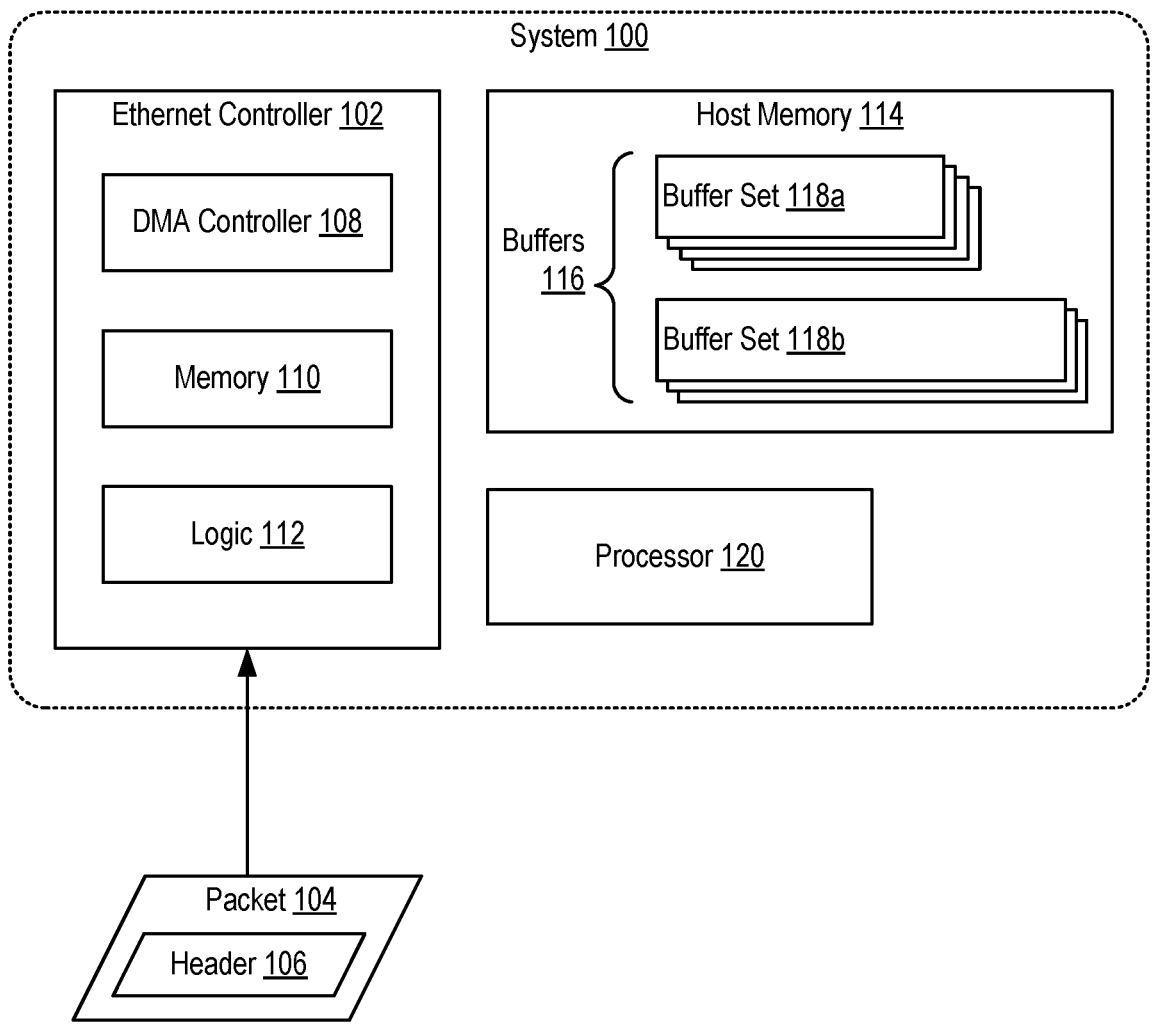
FIG. 1 shows a block diagram of an example system configured for dynamic buffer selection in ethernet controllers in accordance with embodiments of the present disclosure.

Exemplary methods, apparatus, and products for dynamic buffer selection in ethernet controllers in accordance with the present disclosure are described with reference to the accompanying drawings, beginning with FIG. 1. FIG. 1 sets forth an example block diagram of a system 100 configured for dynamic buffer selection in ethernet controllers according to embodiments of the present disclosure. The example system 100 of FIG. 1 includes an ethernet controller 102, host memory 114, and a processor 120. The example ethernet controller 102 of FIG. 1 includes a direct memory access (DMA) controller 108, memory 110, and logic 112. The ethernet controller 102 may also include other computer components, hardware, software, firmware, and the like not shown here. The example host memory 114 of FIG. 1 includes a number of buffers that may be grouped into a number of different sets of buffers, such as buffer sets 118. Each buffer set 118 may include a different number of buffers and the buffers of each buffer set 118 may differ in buffer size. For example, the buffer sets 118 of FIG. 1 include buffer set 118a and buffer set 118b, with buffer set 118a including more buffers, and smaller buffers, than buffer set 118b.

The example ethernet controller 102 of FIG. 1 may receive a header 106 of a packet 104 at the local memory 110, where logic 112 may determine the length of the packet using information stored in the header 106. If the length of the packet cannot be determined, the ethernet controller may assume a large packet length for the packet. A packet 104 may be an Internet Protocol (IP) packet encapsulated within an ethernet frame (not shown in FIG. 1) and include a header, a source address, a destination address, a payload, error correction, and the like. The packet length determined by the ethernet controller may be the total length of the packet 104.

Readers of skill in the art will recognize that an ethernet frame is transmitted on the Data Link layer within the same network using a MAC address for the source and destination address, while an IP packet, such as the example packet 104 of FIG. 1, is transmitted on the Network layer between different networks using an IP address for the source and destination address. An ethernet frame may include additional information besides the encapsulated IP packet, such as a destination MAC address, a source MAC address, an ether type, and the like. The ethernet controller may receive the packet header 106 as part of a received ethernet frame which encapsulates the packet 104 and the packet header 106.

Upon determining the length of the packet, the DMA controller 108 of FIG. 1 will select one of the buffers 116 in host memory 114 based on the length of the packet and transfer the packet to the selected buffer. The buffers 116 of host memory may be provisioned prior to the DMA controller selecting a buffer from the buffers 116. In continuing with the above example, the DMA controller may select, for the packet 104, a buffer from buffer set 118a, whose buffers are smaller in size than the buffers of buffer set 118b, based on a determination that the length of the packet is short. The length of the packet may be determined by comparing the length of the packet to one or more thresholds, where each buffer set may have an associated threshold or range.

Continuing with the above example, the DMA controller 108 may select a buffer for the packet by selecting a DMA descriptor (not shown in FIG. 1). A DMA descriptor may identify one of the buffers 116 included in host memory 114 and there may be a separate DMA descriptor for each buffer. DMA descriptors may be chained together to form a DMA descriptor chain (not shown in FIG. 1), where each DMA descriptor in a DMA descriptor chain references the next DMA descriptor in the chain. In one embodiment of the present disclosure, there may be a separate DMA descriptor chain for each of a number of buffer sets 118 of the buffers 116. In continuing with the above example where the DMA controller selects a buffer from buffer set 118a based on a determination that the length of the packet is short, the DMA controller may make such a selection by selecting a DMA descriptor from a descriptor chain which references buffers from buffer set 118a. After the DMA controller has selected a buffer for packet 104, the DMA controller may continue by transferring the packet to the selected buffer of the host memory. Transferring the packet to the selected buffer may be carried out by copying the received packet 104 to the buffer identified by the selected DMA descriptor.

Figure 2:
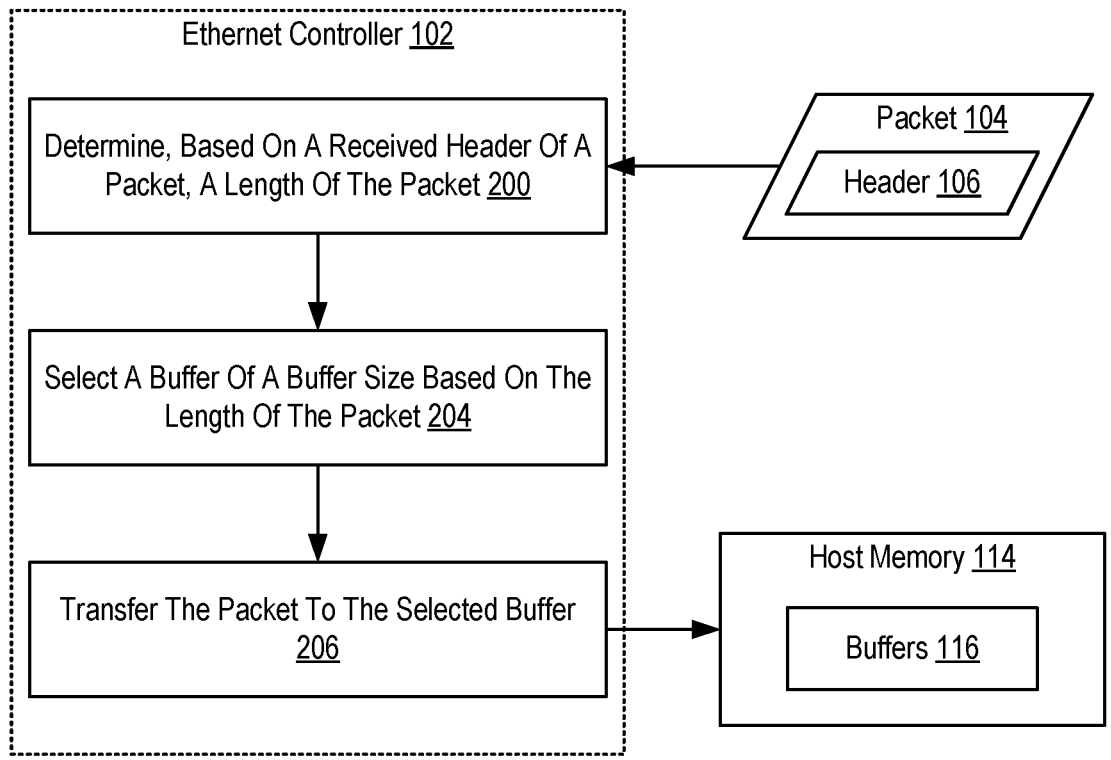
FIG. 2 is a flowchart of an example method for dynamic buffer selection in ethernet controllers according to some embodiments of the present disclosure.

For further explanation, FIG. 2 sets forth a flowchart illustrating an example method of dynamic buffer selection in ethernet controllers according to embodiments of the present disclosure. The method of FIG. 2 includes determining 200, by an ethernet controller 102, a length of a packet 104 based on the received header 106 of the packet 104. Determining 200 the length of the packet 104 may be carried out by the ethernet controller storing the header in memory 110 local to the ethernet controller and using the information included in the packet header 106 to determine the packet length. The packet 104 may be stored in the memory 110 local to the ethernet controller prior to determining the packet length of the packet. The determination 200 of the packet length may be carried out by logic 112 of the ethernet controller, by firmware, or the like. The entire packet 104 may be received by the ethernet controller in parallel with or following the receiving of the packet header 106. Although not shown in FIG. 2, the packet header 106 identifies the length of the packet 104.

The method of FIG. 2 also includes selecting 204, from a number of buffers 116, a buffer of a buffer size based on the determined length of the packet. In the method of FIG. 2, the buffers 116 are included in host memory 114 and may include a number of different buffer sizes. Selecting 204 a buffer may be carried out by the DMA controller 108 of FIG. 1 selecting a buffer with a buffer size based on the determined length of the packet. For example, the DMA controller may select, for the packet 104, a buffer from buffer set 118b, whose buffers are larger in size than the buffers of buffer set 118a, based on a determination that the length of the packet is large. The length of the packet may be determined by comparing the length of the packet to one or more thresholds, where each buffer set may have an associated threshold or range. In such an example, the packet length of the packet may be determined as large in response to determining that the packet length is greater than one or more thresholds or falls within a predefined range associated with a buffer set containing larger buffers.

The method of FIG. 2 also includes transferring 206 the packet 104 to the selected buffer. Transferring 206 the packet 104 to the selected buffer may be carried out by the DMA controller 108 of FIG. 1 copying the packet 104 into the buffer selected within the host memory 114. For example, the DMA controller may copy the packet 104 into a buffer selected from buffer set 118a of FIG. 1, whose buffers are smaller in size than the buffers of buffer set 118b, based on a determination that the length of the packet falls below one or more thresholds or is within a range corresponding to the buffer size of buffer set 118a.

Figure 3:
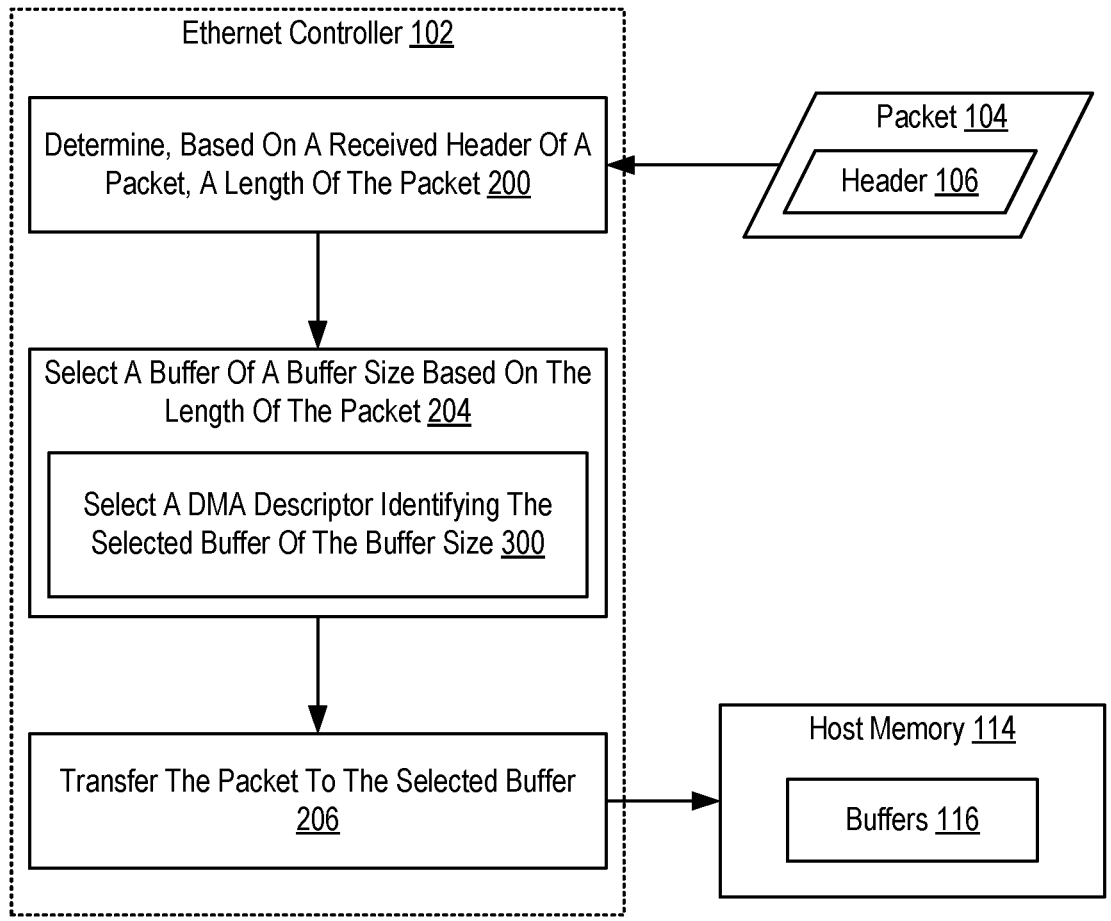
FIG. 3 is a flowchart of an example method for dynamic buffer selection in ethernet controllers according to some embodiments of the present disclosure.

For further explanation, FIG. 3 sets forth a flowchart illustrating an example method of dynamic buffer selection in ethernet controllers according to embodiments of the present disclosure. The method of FIG. 3 continues with the method of FIG. 2 by further including, as part of selecting 204 a buffer of a buffer size based on the determined length of the packet, selecting 300 a DMA descriptor identifying the selected buffer of the buffer size. In the method of FIG. 3, the selected DMA descriptor is one of a number of DMA descriptors, where the DMA descriptors each identify a buffer of the buffers 116 in host memory 114. Selecting 300 a DMA descriptor may be carried out by the DMA controller 108 of FIG. 1 selecting a DMA descriptor identifying a buffer with a buffer size for selection based on the determined length of the packet. The DMA descriptors may be grouped into a number of DMA descriptors chains, with each DMA descriptor chain having DMA descriptors that identify buffers of the same size. For example, each of the DMA descriptors identifying buffers with a same buffer size are included in a same DMA descriptor chain. In continuing with the above example where the DMA controller selects a buffer for packet 104 from buffer set 118a based on a determination that the length of the packet is short, the DMA controller may make such a selection by selecting a DMA descriptor from a descriptor chain which references buffers from buffer set 118a.

In view of the explanations set forth above, readers will recognize that the benefits of dynamic buffer selection in ethernet controllers according to embodiments of the present disclosure include:

Reducing the amount of host memory allocated for ethernet controller buffers by using buffer sets with different buffer sizes and dynamically allocating the packets to the buffers based on packet length.

Increasing host memory efficiency by allocating only packets with larger packet lengths to large buffers, thereby reducing wasted space in large buffers.

Exemplary embodiments of the present disclosure are described largely in the context of a fully functional computer system for dynamic buffer selection in ethernet controllers. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
   determining, by an ethernet controller, based on a received header of a packet, a length of the packet;
   selecting, from a plurality of buffers, a buffer of a buffer size based on the length of the packet, wherein the plurality of buffers comprises a plurality of different buffer sizes, wherein the plurality of buffers includes a first set of buffers with a first buffer size and a second set of buffers with a second buffer size, wherein the second buffer size is greater than the first buffer size;
   transferring the packet to the selected buffer; and
   responsive to failing to determine the length of the packet, selecting a buffer from the second set of buffers.

2. The method of claim 1, wherein selecting the buffer is performed by a direct memory access (DMA) controller included as a component of the ethernet controller, wherein selecting the buffer is based on both the length of the packet and the buffer size for the buffer.

3. The method of claim 1, wherein selecting the buffer includes selecting a DMA descriptor identifying the selected buffer of the buffer size, wherein the selected DMA descriptor is one of a plurality of DMA descriptors, the plurality of DMA descriptors identifying the plurality of buffers.

4. The method of claim 3, wherein each of the plurality of DMA descriptors identifying buffers with a same buffer size are included in a same DMA descriptor chain.

5. The method of claim 1, wherein the first set of buffers comprises a greater number of buffers than the second set of buffers.

6. An apparatus comprising a computing device, a computer processor, and a computer memory operatively coupled to the computer processor, the computer memory having disposed within it computer program instructions that, when executed by the computer processor, cause the apparatus to carry out the steps of:
  determining, by an ethernet controller, based on a received header of a packet, a length of the packet;
  selecting, from a plurality of buffers, a buffer of a buffer size based on the length of the packet, wherein the plurality of buffers comprises a plurality of different buffer sizes, wherein the plurality of buffers includes a first set of buffers with a first buffer size and a second set of buffers with a second buffer size, wherein the second buffer size is greater than the first buffer size;
  transferring the packet to the selected buffer; and
  responsive to failing to determine the length of the packet, selecting a buffer from the second set of buffers.

7. The apparatus of claim 6, further comprising a direct memory access (DMA) controller, wherein selecting the buffer is performed by the DMA controller.

8. The apparatus of claim 6, wherein selecting the buffer includes selecting a DMA descriptor identifying the selected buffer of the buffer size, wherein the selected DMA descriptor is one of a plurality of DMA descriptors, the plurality of DMA descriptors identifying the plurality of buffers.

9. The apparatus of claim 8, wherein each of the plurality of DMA descriptors identifying buffers with a same buffer size are included in a same DMA descriptor chain.

10. The apparatus of claim 1, wherein the first set of buffers comprises a greater number of buffers than the second set of buffers.

11. A computer program product comprising a non-volatile computer readable storage medium and computer program instructions stored therein that are configured to, when executed by a processor, cause a computer to perform operations comprising:
  determining, by an ethernet controller, based on a received header of a packet, a length of the packet;
  selecting, from a plurality of buffers, a buffer of a buffer size based on the length of the packet, wherein the plurality of buffers comprises a plurality of different buffer sizes, wherein the plurality of buffers includes a first set of buffers with a first buffer size and a second set of buffers with a second buffer size, wherein the second buffer size is greater than the first buffer size;
  transferring the packet to the selected buffer; and
  responsive to failing to determine the length of the packet, selecting a buffer from the second set of buffers.

12. The computer program product of claim 11, wherein selecting the buffer is performed by a direct memory access (DMA) controller included as a component of the ethernet controller.

13. The computer program product of claim 11, wherein selecting the buffer includes selecting a DMA descriptor identifying the selected buffer of the buffer size, wherein the selected DMA descriptor is one of a plurality of DMA descriptors, the plurality of DMA descriptors identifying the plurality of buffers.

14. The computer program product of claim 13, wherein each of the plurality of DMA descriptors identifying buffers with a same buffer size are included in a same DMA descriptor chain.

15. The computer program product of claim 11, wherein the first set of buffers comprises a greater number of buffers than the second set of buffers.

* * * * *